July 3, 1934.  A. M. ELLIS  1,965,492

SHOCK ABSORBING SPRING

Filed Oct. 26, 1933  3 Sheets-Sheet 1

Inventor
A. M. Ellis
By Wilkinson & Mawhinney
Attorneys

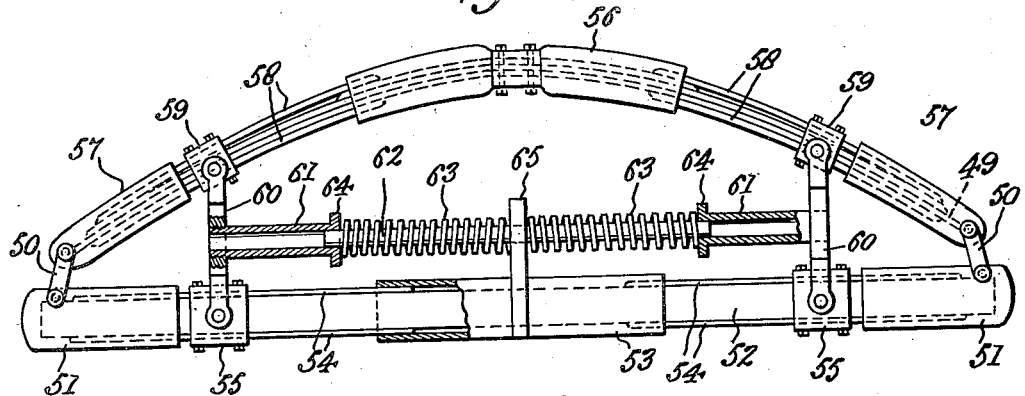

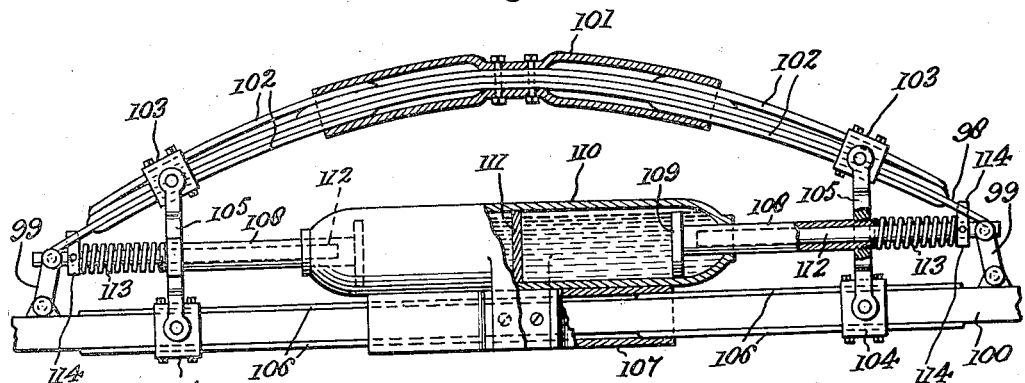
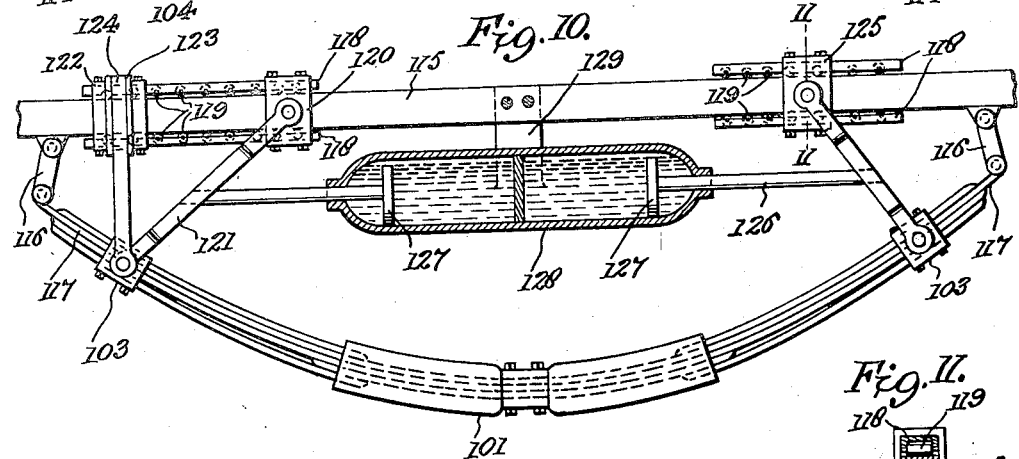
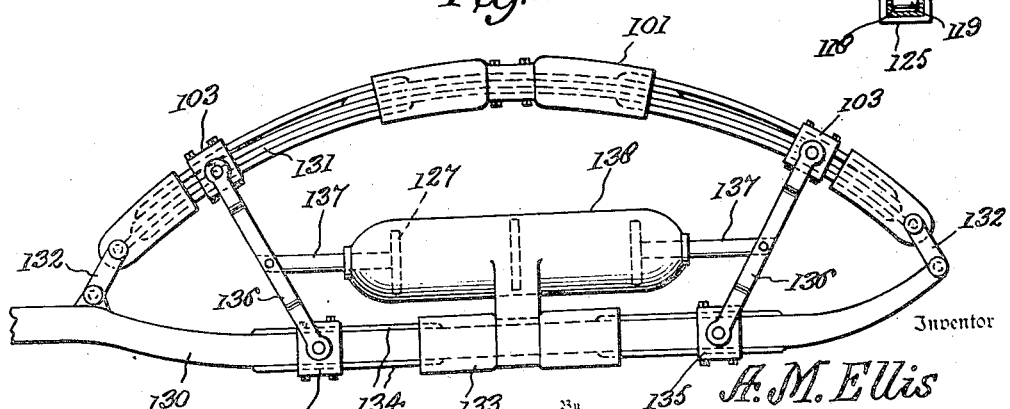

Patented July 3, 1934

1,965,492

UNITED STATES PATENT OFFICE 1,965,492

SHOCK ABSORBING SPRING

Arthur M. Ellis, Sweetwater, Tenn.

Application October 26, 1933, Serial No. 695,353

16 Claims. (Cl. 267—18)

The present invention relates to suspension springs adapted for various uses, such as in the suspension of bodies of motor vehicles, railway rolling stock, airplanes, machinery of all kinds and in any other position where spring support or suspension is required.

An object of the present invention is to combine in a spring structure shock absorbing effects to retard the compression and recoil of the spring and to thus not only prevent damage to the spring but also sudden shock upon the object supported.

The invention further aims in a combined shock absorbing spring certain structural advantages adapting the spring to full elliptic, semi-elliptic or other desired type of spring embodying a normally curved spring leaf structure which is flattened to a more or less extent under compression and which in its recoil seeks its normal curved or relatively angular position.

The invention has for a further object to provide a spring check which may be built into or upon the spring structure and which is capable of adjustment so as to coact with the spring under different load or shock absorbing conditions.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation, partly in section, of a full elliptic spring structure embodying the shock absorbing features of the present invention.

Figure 5 is a like view showing another modification in the structure.

Figure 6 is a side elevation, partly in section, of another modified form, particularly of the checking or snubbing device.

Figure 7 is a detail fragmentary sectional view of a modified form of the sleeve and housing structure for the spring.

Figure 8 is a detail fragmentary sectional view of one end of a modified form of the slide and enclosing devices for the spring.

Figure 9 is a side elevation, partly in section, of a further modified form of the spring structure wherein fluid and spring means are employed for checking or controlling the movements of the main spring.

Figure 10 is a like view of a further modified form of the spring structure showing the same adapted to the underslung construction.

Figure 11 is a detail enlarged section taken on the line 11—11 of Figure 10 showing roller bearing mountings for the slide member of the spring structure and Figure 12 is a side elevation of a further modified form of the spring structure showing the mounting of a semi-elliptic spring structure on the side bar of a vehicle frame.

Figure 1:
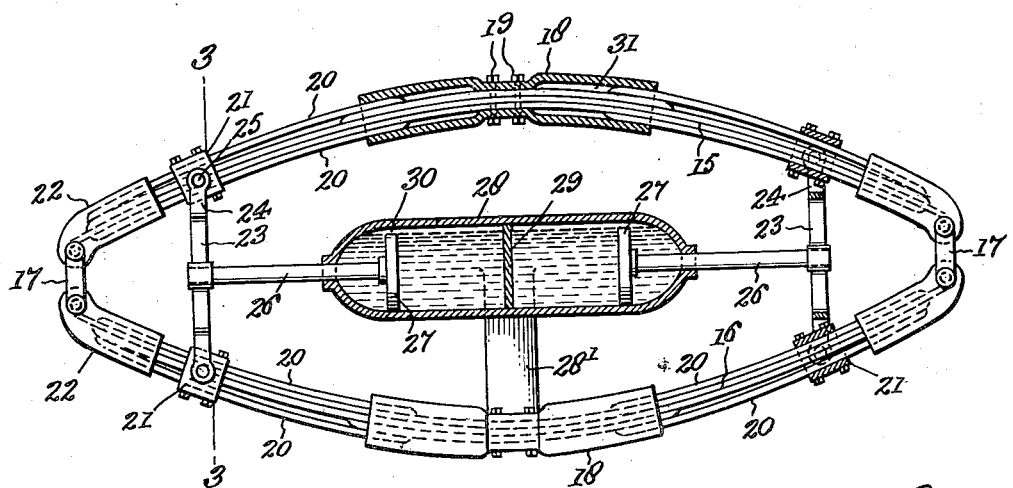

Referring now to the drawings and first to the form shown in Figures 1, 2 and 3, 15 and 16 are the upper and lower springs of a full elliptic spring which are coupled together at their opposite ends by links or shackles 17 in any appropriate manner. These springs 15 and 16 may be of single leaf construction, or multiple leaf construction, depending upon the weight and pressure adapted to be applied to the spring structure. Intermediately, each of the springs 15 and 16 is provided with a shackle housing 18 which is permanently attached to the intermediate portion of the respective springs by means of bolts 19 or the like. The opposite ends of each housing 18 are enlarged sufficiently to slidably receive therein slide leaves 20 which are disposed against the opposite sides of the springs 15 and 16 and adjacent the opposite ends thereof so that the springs 20 may freely slide with one end in the adjacent casing 18 lengthwise upon the springs 15 and 16. As shown in Figure 1, there is thus disposed a pair of the slide springs 20 upon each end portion of the springs 15 and 16, and each pair of slide springs 20 is secured to a sliding sleeve 21 which surrounds the springs 15 and 16 and is adapted to move with the slide springs 20. Each sleeve 21 is fixed to its respective pair of slide springs 20 near the outer ends of the latter, and said outer ends of the slide springs 20 are slidably disposed in cap pieces 22 which are fixed upon the opposite ends of the springs 15 and 16 and which are enlarged sufficiently at their inner ends to correspond with the casings 18 for slidably holding and guiding the slide springs 20.

The slide springs 20 are preferably of the same material and dimensions as that of the adjacent portions of the main springs 15 and 16 so as to reinforce and strengthen the latter, and the slide springs 20 are disposed in any suitable sliding engagement with the springs 15 and 16 either by surface contact, by the use of bearings or the like.

Figure 3:
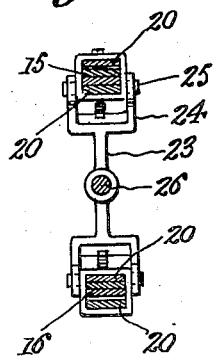
Figure 3 is a transverse section taken through the spring structure near one end thereof, on the line 3—3 of Figure 1, and showing the connecting link or bar which is carried by the sliding sleeves.

The sleeves 21 are disposed opposite each other at each end of the spring structure, and each pair of springs is connected together by a connecting bar or rod 23 which may be of any suitable construction and which is shown in Figure 3 as comprising a relatively flat body bar having forks 24 at opposite ends, the arms of which have registered apertures therein through which rotatably engage studs 25 projecting outwardly from the opposite sides of the sleeves or collars 21 so that the sleeves or collars are pivotally mounted in the forks 24 and are held in a predetermined spaced relation by the bar or rod 23.

Figure 2:
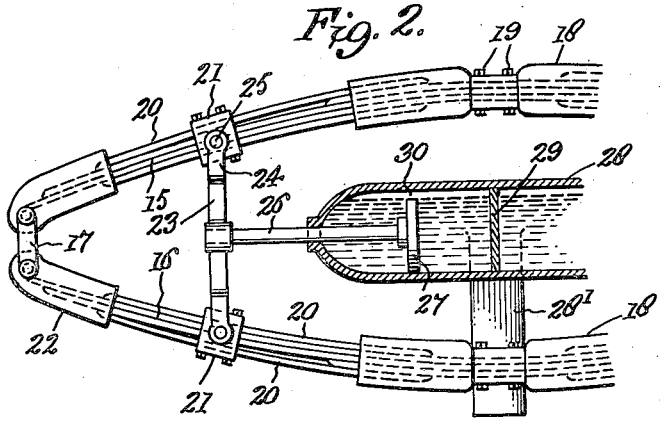
Figure 2 is a fragmentary view of one end of the same showing the structure under compression.

At each end of the spring structure the adjacent end portions of the main springs 15 and 16 diverge inwardly from their adjacent connecting link 17 and when the spring is subjected to compression, as shown in Figure 2, the wedging action of the springs against the collars or sleeves 21 advances the latter toward the center of the spring structure. As a result the connecting bar or rod 23 is carried therewith so as to maintain the fixed spacing apart of the sleeves 21.

To more or less check or control this sliding movement of the sleeves 21, each bar 23 is provided intermediate its ends with a fixed piston rod 26 to the inner end of which is connected a piston 27 slidable in a cylinder 28. As the connecting rods 23 are disposed in alinement and consequently the piston rods 26 are also in longitudinal alinement with respect to the spring structure, the cylinders 28 of the pistons 27 may be combined in a single cylinder structure having a central partition or wall 29 intermediate its ends. Each piston 27 is provided, at preferably its upper portion, with a port 30 of sufficient size to admit the transfer of a buffing fluid from one side of the piston 27 to the other so as to check and control the movement of the piston and thus check or control the movement of the sleeves or collars 21. It will be noted in the spring structure of Figure 1, the casings or housings 18 may be provided therein with reinforcing or bracing leaves 31 which overlap the intermediate portions of the main spring leaves 15 and 16 and which also serve as a support for the outer sliding leaves 20. The sliding leaves 20 are of sufficient length only to engage within the opposite ends of the housings 18 and the cap pieces 22 so that there will be sufficient space or clearance at the opposite ends of the slide leaves 20 to admit of the necessary reciprocating movements of the slide springs 20 and their sleeves 21.

The cylinder structure 28 may be supported in any suitable manner to permit it to remain at an intermediate point between the upper and lower main leaf springs 15 and 16. In the present instance fork or guide arms 28' are mounted on the intermediate portion of the cylinder 28 and slidably engage against the opposite sides of the lower housing 18. The arms of the fork 28' engage in the recess or guides at opposite sides of the housing 18 so as to hold the cylinder 28 against longitudinal displacement but to admit of the compression and expansion of the springs 15 and 16.

Figure 4:
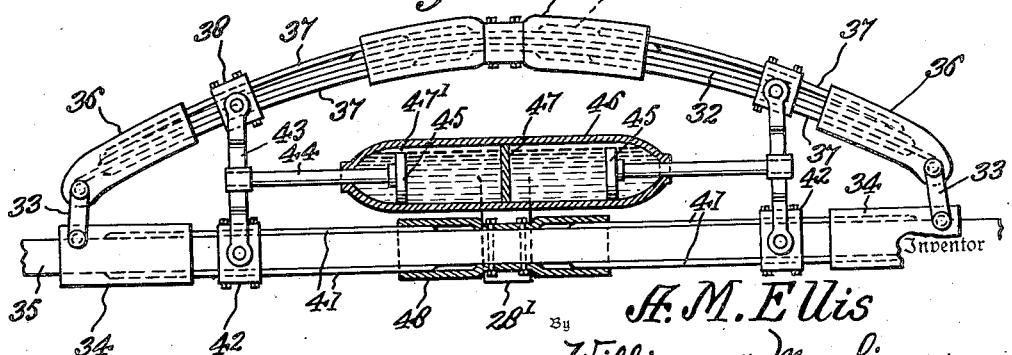
Figure 4 is a side elevation, partly in section, of a slightly modified form of the spring structure.

Referring now to the modification shown in Figure 4, the spring structure is disclosed as of the semi-elliptic type. In this construction the main leaf or spring 32 is connected by links or shackles 33 to cap pieces 34 which are suitably fixed upon a relatively straight and rigid bar or rail 35. The opposite ends of the main leaf spring 32 are provided with caps 36 having their inner ends suitably enlarged for slidably receiving the upper and lower slide springs 37 which are fixed to and carried by the sleeves or collars 38, one upon each end portion of the main leaf 32. A central housing 39 is mounted upon the central portion of the main leaf 32 in a manner similar to that shown in Figure 1 and is provided with a reinforcing leaf 40 serving as a support and guide for the outer leaves 37 of the slides.

In this instance the rail 35 supports slide leaves 41 at its inner and outer sides and the slide leaves 41 are connected to slide collars or sleeves 42 constructed similar to the sleeves 38 and which are of sufficient size to fit upon the rail 35. The sleeves 38 and 42 are arranged in pairs at the opposite ends of the spring structure and connecting rods or bars 43, of the type shown in Figure 3, are hingedly connected at opposite ends to the sleeves 38 and 42 of the respective bars. Each bar 43 carries a piston rod 44 upon which is mounted the piston 45 movable in the cylinder 46. The cylinder 46 may be a composite structure with a partition 47 intermediate its ends providing a separate cylinder at each end of the structure for each piston 45. The pistons 45 have ports 47' therein for the controlled passage of oil or other suitable fluid between the opposite sides of the pistons 45 to check the reciprocating movements of the sleeve bars 43. The slide leaves 41 on the rail 35 engage at their inner ends in the opposite ends of a housing 48 which is fixed to the intermediate portion of the rail 35 and the caps 34 on the rail are of suitable size to receive the outer ends of the slides 41.

In both of these forms of the invention, compression of one or both of the main springs urges the slide collars inwardly and such action is retarded or controlled by means of the fluid in the cylinders so that the spring structure cannot be collapsed quickly, nor can, upon recoil, they expand to and beyond their normal condition with too rapid a movement.

This double checking of the spring structure is adapted to absorb shock and prevent injury to the spring structure and to the devices or objects supported thereby.

With reference now to the form of the invention shown in Figure 5, the main spring or leaf structure 49 is connected by links or shackles 50 to caps 51 mounted on the opposite ends of a straight rail or bar 52. In all instances of the present invention the rail or bar 52 may comprise any suitable structure, as the portion of the frame of a motor vehicle, or a frame bar of a machine or any other object or device to which the spring structure may be attached. The bar or rail 52 has intermediately a housing or casing 53, the ends of which correspond to the inner open ends of the caps 51 for slidably receiving therein the slide springs or straps 54 disposed against the inner and outer sides of the rail 52 and which are secured to the sleeve or collar 55 which is mounted on the rail 52. This structure, prevailing at each end of the rail 52 and the main leaf spring 49, is in a similar manner provided with a central housing 56, the ends of which are of sufficient dimensions to cooperate with caps 57 at opposite ends of the main spring 49 to slidably receive therein the slide springs 58 attached to and movable with their respective collars 59. The collars 59 and 55, disposed in pairs at the opposite ends of the spring structure, are connected together by the bars or rods 60 which carry piston rods 61 which are preferably hollow in the present instance and receive therein the opposite ends of a guide rod 62 upon the opposite end portions of which are disposed coil springs.

The piston rods 61 at their inner ends have heads or out-turned flanges 64 providing seats for the outer ends of the springs 63 and the inner ends of the springs 63 engage against the opposite sides of a partition 65 which is preferably recessed or forked at its lower end for receiving therein the intermediate portion of the housing 53.

Compression of the main leaf spring 49 wedges or forces the sleeves 59 inwardly and, through the bars or rods 60, forces the sleeves or collars 55 also inwardly on the rails 52. The collars 55 brace the connecting rods 60 which carry the piston rods 61. The inward movement of the piston rods 61 is checked or retarded in this instance by the springs 63 which are compressed more or less according to the deflection of the spring structure.

In this instance, the recoil is not checked but where such is required, such attachment may be readily resorted to such as by other structural features disclosed herein or by any well-known shock absorbing or checking device.

In the modified construction shown in Figure 6, the main leaf spring 66 has end caps 67 within which engage the outer ends of the slide leaves 68 secured to their respective sleeves or collars 69. The main leaf 66 is provided with an intermediate housing 70 into the opposite ends of which slidably engage the inner ends of the slide leaves 68 as hereinbefore set forth.

The opposite ends of the main leaves 66 are connected by links or shackles 71 to end caps 72 and 73 mounted on the opposite ends of the bar or rail 74. The rail 74 carries an intermediate housing 75, and at opposite ends of the rail 74 there are disposed bars of inner and outer slide springs or plates 76. The slide members 76 at one end of the rail 74 are secured to a sleeve 77 which is offset centrally from the adjacent sleeve 69 on the main leaf 66 and the connecting rod 78 which connects the sleeves 69 and 77 is disposed at a slight angle for connecting the sleeves in this peculiar relation. At the other end of the spring structure the slide members 76 are secured to a sleeve 79 which is displaced centrally a greater distance from its adjacent sleeve 69 than is the sleeve 77 so that the connecting rod 80 lies at a considerably sharper angle with respect to the rail 74 than the angle of the connecting rod 78.

The connecting rods 78 and 80 each carry a hollow piston rod 81 which has at its inner end a ported piston 82 movable in a cylinder 83 which is preferably of the double type above described and provided intermediately with a partition 84. A rod 85 is carried by the partition 84 and projects in opposite directions into the hollow piston rods 81. A coil spring 86 is mounted upon each end of the rod 85 between the adjacent side of the partition 84 and the adjacent piston 82 so that inward movement of the slides of the spring structure is resisted and controlled not only by the checking fluid used but also by the resistance of the springs 86 to compression.

The recoil, however, while checked by the fluid in the cylinder 83, is aided and maintained somewhat constant by the pressure of the springs 86 in expanding to normal position.

A modified form of slide may be used, such as shown in Figure 7. In this case the central housing 87 and the end cap 88 support therein the opposite ends of a suitably flexible cover or casing 89 adapted to be shifted in an endwise direction and to a more or less extent into and out of the opposite ends of the housing 87 and the cap 88. The cover 89 is carried about slide springs 90 and the slide springs as well as the cover 89 are secured to the collar or sleeve 91 which is slidably disposed upon the main leaf or leaf structure.

Another modification of the leaf cover is shown in Figure 8. In this instance the sleeve or collar 92 has fixed to it the inner and outer slide springs 93 and the latter are provided near their outer ends and at their outer opposite faces with ribs or projections 94 which are disposed in line and adapted to engage with similar ribs or projections 95 arranged upon the inner opposite faces of a pair of cover slides 96 which are slidably disposed at their outer ends in the end cap 97. The sleeve 92, in sliding inwardly of the spring structure, carries the slide leaves 93 therewith and moves the ribs 94 into engagement with the ribs 95 whereupon the sliding movement is communicated to the covering strips or leaves 96 and the latter are then withdrawn from the cap 97 to a limited extent.

It will be noted that the free ends of the sliding leaf structure are covered so that grit and foreign substances cannot readily gain access to the bearing surfaces of the slide leaves 93 upon the main spring or leaf structure. It is apparent that upon the return or outer sliding movement of the sleeve 92, the latter will engage the inner ends of the cover springs 96 after the ribs 94 and 95 have been separated a predetermined distance so that the sleeve 92 then forces the cover strips or springs 96 back into the cap 97.

In the modification shown in Figure 9, the main leaf or spring 98 is connected at opposite ends by shackles 99 to a guide rail 100. The main leaf 98 is provided with an intermediate housing 101 open at its opposite ends to slidably receive therein the inner ends of slide springs 102 which are secured to and slidable with the sleeve or collar 103. The rail 100 carries slide collars 104 which are disposed in line with the collars 103 and connected thereto by connecting rods or bars 105. The collars 104 carry slide springs or plates 106 which bear against the inner and outer sides of the bar or track 100 and which slidably engage in the opposite ends of a central housing 107 which is fixed to the track. Each connecting rod or bar 105 is secured at its intermediate portion upon the outer end of a hollow piston rod 108 and each of which is provided upon its inner end with a piston 109.

The pistons 109 are disposed in the opposite ends of a cylinder 110 having a central partition 111 and suitably mounted upon the housing 107. The hollow piston rods 108 have projecting into the outer ends thereof rods 112 which are secured at their outer ends to the opposite ends of the main spring 98 and which are disposed coaxially with the piston rods 108. Springs 113 are mounted upon the rods 112 and bear at their inner ends against the connecting rods 105 and at their outer ends against head pieces 114 which are mounted on the rods 112 inwardly of the pivotal ends of the main spring 98. The action in this case is that the springs 113 aid in the compression of the main spring 98 depending upon the normal compression of the springs 113, and maintain to a more or less extent a steady inward movement of the pistons 109 when the spring structure is subjected to compression. The springs 113 also serve to check the recoil or rebound of the spring structure when the load is released.

In Figure 10 a further modification of the invention is shown. In this instance the spring is disclosed in an underslung position and the rail or bar 115 is uppermost and is connected by shackles 116 to the opposite ends of a main leaf structure 117. The main leaf structure 117 is provided with the sleeves 103 and their other slide parts as shown in Figure 9. The rail 115, however, carries at one end a slide composed of plates 118 which are constructed with recesses therein for the reception of bearings 119 which may be of the roller type as shown in Figure 11 and which engage against the adjacent edge portions of the rail 115.

The slide plates 118 are provided at their inner ends with a connecting sleeve or collar 120 which is connected by a rod or bar 121 to the adjacent sleeve or collar 103 on the leaf spring 117. The other ends of the slide plates 118 are connected together however by a second sleeve or collar 122 provided with an annular groove 123 for the reception of a check strap 124 which engages about the second collar 122 and has its ends anchored upon the adjacent sleeve 103 of the main spring. This check strap 124 is adapted to relieve the connecting rod 121 of the great straining which would otherwise be imposed upon it incident to its angular position between the sleeves 103 and 120.

At the other end of the spring structure the sleeve 103 is connected by its rod 121 to a sleeve or collar 125 which is secured to the intermediate portions of the adjacent slide plates 118. Each connecting rod or bar 121 carries a piston rod 126 with a piston 127 on its inner end operable in a cylinder 128 secured by a bracket 129 to the intermediate portion of the rail 115. The check strap 124 thus serves to check the recoil or rebound of the spring structure so that damage will not result to the connecting rods, pistons or the like.

In the modification shown in Figure 12, the spring structure is shown as directly applied to the frame bar 130 of a motor vehicle or the like and the main leaf 131 is connected at opposite ends by shackles 132 to the frame bar 130.

The frame bar 130 has the central housing 133 into the opposite ends of which engage the slide leaves or plates 134 carried by the sleeves or collars 135. Connecting rods 136 diverge from the collars 135 to the collars 103 which are mounted upon the main leaf spring 131 in the manner shown in Figures 9 and 10. The connecting bars or rods 136 have piston rods 137 which engage in the opposite ends of the cylinder 138, the latter being mounted upon the frame bar 130 through the housing 133. In this form of the invention the compression of the spring structure forces the slides 103 and 135 inwardly and such action is checked by the cylinder and piston device as hereinabove explained.

The slides, such as 20 in Figure 1, may of course be constructed of the flat short springs shown, or they may be made in sections or in any other suitable manner for engaging the main leaf spring for transferring pressure incident to the deflection of the main spring into a different direction and to the controlling or regulating device which is connected to the slide. The regulating or controlling means, such as the piston and cylinder providing dash pots, the springs and the like, operate upon the slide to effect the desired movement thereof lengthwise of the main spring when that spring is deflected either by compression or recoil, and consequently the control means serves as a yielding anchor for the slide.

The slides also serve to reinforce the main leaf spring and prevent the sharp deflection thereof, particularly in the region of the sleeve 21, so that the main leaf spring is protected to a large extent when subjected to shock and such shock may be absorbed through the slide and the control means connected thereto.

It will be noted that the sleeves 21 at opposite ends of the spring structure are disposed in pairs and are interbraced by the cross bars 23 so that each cross bar and its sleeves comprises a wedge element, and thrust inwardly upon one of the sleeves by reason of the compression of its spring is transmitted through the cross bar 23 to the opposite sleeve so that the latter takes up the pressure and moves inwardly with the cross bar and the other sleeve to an extent and rate controlled by the piston 27 and cylinder 28, or other structure which may be employed as above described. The function of the rails, in case of the use of a semi-elliptic spring, is to support the opposite sleeve or slide, such as 42 in Figure 4, so that the thrust imposed on the slide 38 of the leaf spring will be converted into longitudinal movement with respect to the spring and checked only by the dash pot or other controlling means used.

It will be obvious that various changes in the construction, combination and arrangement of parts may be made which could be used without departing from the spirit of my invention and I do not mean to limit the invention to such details except as particularly pointed out in the claims.

Having thus described my invention, what I claim and desire to secure by Letters Patent of the United States is:—

1. In a shock absorbing spring, a leaf spring, a slide engaging the leaf spring for free movement lengthwise thereof upon deflection of the spring, and control means connected to the slide said control means comprising a fixed member, a movable member carried by the fixed member, and means fixed to said movable member and pivotally engaging the slide to connect the slide to the movable member.

2. In a shock absorbing spring, a leaf spring, a slide mounted on the leaf spring for free movement relative thereto, and a retarding element connected to the slide for controlling the movement thereof along the leaf spring upon the deflection thereof.

3. In a shock absorbing spring, a leaf spring, a slide mounted on the leaf spring for free movement relative thereto, and a retarding structure connected to said slide and operable in opposite directions for retarding the movement of the slide lengthwise of the leaf spring upon the compression and recoil of the latter.

4. In a shock absorbing spring, a leaf spring, a slide mounted on the leaf spring for free movement relative thereto, a second slide, supporting means for the second slide, a cross bar connecting said slides to hold the same in predetermined relation for simultaneous sliding movement, and a controlling element connected to said cross bar for regulating the movement of said slides upon the deflection of the spring.

5. In a shock absorbing spring, a leaf spring, a slide mounted on the leaf spring for free movement relative thereto, and a control member connected to said slide and arranged lengthwise of said spring for regulating the movement of the slide lengthwise of the spring upon the deflection of the latter said control member comprising a fixed member, a movable member carried by the fixed member and means for retarding the movement of the movable member.

6. In a shock absorbing spring, a leaf spring, a slide mounted on the end portion of the leaf spring for free movement relative thereto, a shock absorbing element connected to said slide and disposed lengthwise of the general direction of the leaf spring and on an axis intersecting the axis of said end of the leaf spring whereby said end of the leaf spring presents an inclined surface to said slide for moving the latter lengthwise of the spring when the spring is deflected.

7. In a shock absorbing spring, a leaf spring member, a supporting member, means for connecting said members together at their opposite ends and for relative movement upon compression of the leaf spring member, a pair of opposed slides mounted on said members, a cross bar connecting said slides together to move as a unit, and a retarding device connected to the cross bar for resisting operation of the slide unit upon deflection of said leaf spring member.

8. In a shock absorbing spring, a leaf spring member, a supporting member, a pair of slides mounted on said spring member for free movement lengthwise thereof, a dash pot disposed between said members and connected to said slides for movement therewith, said dash pot adapted to regulate the movement of said slides along said members upon the relative movement thereof.

9. In a shock absorbing spring, a pair of members, means for movably connecting said members together at opposite ends, the end portions of said members diverging inwardly toward the central portion of the members, pairs of slides mounted on the opposite end portions of said members adapted to be advanced inwardly lengthwise of the members when said members are moved toward each other, and a dash pot disposed between said members and connected to said slides for checking the movement of the latter on said members.

10. In a shock absorbing spring, a semi-elliptic spring, a track, shackles connecting the opposite ends of the spring to said track, pairs of slides disposed upon the opposite end portions of the spring and track, cross bars interconnecting the slides at opposite ends of the spring and track to provide wedge elements, and two-way operating dash pots disposed between the spring and the track and connected to said cross bars for regulating the movements of the wedge elements during the compression and recoil of the spring.

11. In a shock absorbing spring, a semi-elliptic spring, a track, shackles connecting the opposite ends of the spring to the track, slides mounted upon the opposite ends of said spring and the opposite ends of said track and disposed in predetermined offset relation with respect to each other at the opposite ends of the spring, cross bars interconnecting the slides of the spring and the track at opposite ends thereof, a cylinder disposed between the intermediate portions of the spring and track and extending lengthwise of the same, a partition in the cylinder, a piston at each side of the partition in the cylinder having a vent port therein, a piston rod extending outwardly from each piston and connected to the adjacent cross bar, and springs arranged between the partiton and said pistons for normally urging the latter outwardly and spreading said spring and track, said cylinder adapted to contain a quantity of fluid for operation against said pistons to regulate the movement thereof.

12. In a shock absorbing spring, a leaf spring, short leaf springs disposed at opposite sides of the first spring, a sleeve secured to said short springs for movement therewith, spaced guide casings mounted on said first spring for receiving therein the opposite ends of the short springs, and retarding means connected to the sleeve.

13. In a shock absorbing spring, a leaf spring, a plurality of short springs arranged lengthwise against the opposite sides of the leaf spring, a sleeve on the leaf spring secured to said short springs for movement therewith, retarding means for said sleeve, a casing enclosing said short springs and connected to the sleeve for movement therewith, and guide casings mounted on the leaf spring and engaging the opposite ends of said short springs to hold the latter to the leaf spring and admit sliding movement thereof.

14. In a shock absorbing spring, a rail, a semi-elliptic spring suspended beneath the rail for relative movement thereto, slides mounted on the opposite ends of said spring, elongated slides mounted upon the opposite ends of the rail, one of said long slides having a sleeve intermediate its ends, a connecting bar between said latter sleeve and the adjacent slide on the spring, a sleeve mounted on the inner end of said other long slide, a cross bar between said latter sleeve and adjacent slide on the spring, a second sleeve disposed on the outer end of said second long slide, a check strap carried by said last named slide on the spring and engaging said second sleeve to check rebound of the spring, and anti-friction bars arranged between said long slides and the rail.

15. In a shock absorbing spring, a side rail having a depressed portion, a semi-elliptic spring, shackles connecting the ends of said spring to the ends of said depressed portion of the rail, a dash pot arranged lengthwise between the rail and the spring, slides mounted upon the opposite ends of the depressed portion of the rail, slides mounted upon the opposite ends of the spring, and connecting bars carried by the slides of the rail and diverging outwardly from each other and connected thereat to the slides on the spring to maintain the slides in offset relation at opposite ends of the spring and rail, said cross bars being secured in angular relation to said dash pot for maintaining the cross bars in fixed angular relation and checking the movements of the pairs of slides toward and from each other.

16. In a shock absorbing spring, a semi-elliptic spring, a pair of slides mounted on the spring one adjacent each end thereof for free movement lengthwise of the spring, and retarding means engaging the two slides to retard the flexing of the spring upon movement of the slides thereon.

ARTHUR M. ELLIS.